(12) United States Patent
Cankaya et al.

(10) Patent No.: US 7,236,767 B1
(45) Date of Patent: Jun. 26, 2007

(54) WIRELESS CELL SITE FINDER AND CUSTOMER SERVICE SYSTEM

(75) Inventors: Bugra Cankaya, Lenexa, KS (US); Vincent Perry Watson, Overland Park, KS (US); Dahl Brougham Metters, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 90 days.

(21) Appl. No.: 11/144,341

(22) Filed: Jun. 3, 2005

(51) Int. Cl.
*H04M 11/00* (2006.01)
(52) U.S. Cl. ...................... 455/405; 455/406
(58) Field of Classification Search ............. 455/405, 455/4.2, 423, 424, 422.1, 456.1, 404.2, 432.3, 455/414.1, 406, 425, 446, 435.2
See application file for complete search history.

(56) References Cited

U.S. PATENT DOCUMENTS

| | | | | |
|---|---|---|---|---|
| 6,751,443 | B2 * | 6/2004 | Haymes et al. | 455/67.11 |
| 6,985,839 | B1 * | 1/2006 | Motamedi et al. | 703/6 |
| 7,043,237 | B2 * | 5/2006 | Snyder et al. | 455/425 |
| 7,092,696 | B1 * | 8/2006 | Hosain et al. | 455/405 |
| 7,099,669 | B2 * | 8/2006 | Sheffield | 455/446 |
| 2002/0099682 | A1 | 7/2002 | Stanton et al. | |
| 2003/0050039 | A1 * | 3/2003 | Baba et al. | 455/404 |
| 2004/0185870 | A1 * | 9/2004 | Matsuda | 455/456.1 |
| 2004/0248546 | A1 * | 12/2004 | Bhaumick | 455/404.2 |
| 2005/0136911 | A1 * | 6/2005 | Csapo et al. | 455/423 |
| 2006/0025142 | A1 * | 2/2006 | Hamilton | 455/446 |
| 2006/0030332 | A1 * | 2/2006 | Carrott et al. | 455/456.1 |
| 2006/0040641 | A1 * | 2/2006 | Dawson et al. | 455/405 |
| 2007/0037574 | A1 * | 2/2007 | Libov et al. | 455/435.2 |

OTHER PUBLICATIONS

Agilent Technologies, Inc., *Agilent OSS Wireless QoS Manager*, 2001, pp. 1-8.
Agilent Technologies, Inc., *Firehunter Goes Mobile*, 2001.
Agilent Technologies, Inc., *Agilent OSS, NETeXPERT Assurance Technical Overview*, 2002, pp. 1-37.

* cited by examiner

*Primary Examiner*—Congvan Tran

(57) ABSTRACT

A customer service system is provided for responding to a service inquiry of a customer based on customer location data within a wireless cellular network having a plurality of current cell sites. A current cell site database includes geocoded site location data for each respective current cell site and statistical performance data for each respective current cell site. A complaint database stores user entered complaint records, each of the records including respective geocoded problem location data and a respective complaint note. A monitoring engine is coupled to the current cell sites and to the current cell site database for collecting the statistical performance data and transferring it to the current cell site database. A web server provides a user interface for accessing the current cell site database and the complaint database.

18 Claims, 6 Drawing Sheets

FIG. 3

Cell Site Finder

Address or Cross Street 1: 100 S. Main St.

Cross Street 2 (optional):

City (optional): Kansas City

State: Missouri

Zip Code (optional):

[Find it!]

Latitude (N): 38.993185
OR
Longitude (W): -94.594244

The address was successfully found as: 100 S. Main St., Kansas City, MO 64114
This Location is IN a problem area that has been marked 6 time(s).

| Lat. | Lon. | Time (GMT) | Note |
|---|---|---|---|
| 38.99243 | -94.59436 | 06/25/2004 19:29:39 | 8174552-040625, dropped calls |
| 38.99263 | -94.59437 | 08/10/2004 13:47:53 | 8389330-040810 - No Service |
| 38.99263 | -94.59437 | 08/17/2004 21:25:14 | 8389330-040810 - No trouble found. |
| 38.9926 | -94.5943 | 08/23/2004 16:15:53 | 8458311-040823, Coverage Related: Dropped Calls |
| 38.99241 | -94.59438 | 01/12/2005 14:27:00 | 0412200016,9449971-041223, Unable to Duplicate, No Trouble Found, RF Engineering, Closure Response Sent |
| 38.99241 | -94.59438 | 01/10/2005 20:36:00 | 0412200015,9498130-041228, Unable to Duplicate, No Trouble Found, RF Engineering, Closure Response Sent |

Note:

[Mark This Location]

This Location is NOT IN a known coverage hole.

WIRELESS CELL SITE FINDER AND CUSTOMER SERVICE SYSTEM

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to performance monitoring in a wireless cellular telephone network, and, more specifically, to a tool for assisting customer service and maintenance personnel in responding to and alleviating customer inquiries or complaints.

Wireless cellular telephone networks deploy large numbers of cell sites within their coverage areas. Each cell site includes an antenna for transmitting and receiving radio signals over a respective geographic area. Coverage areas for adjacent cells overlap so that as a cellular subscriber moves from one cell to another a handoff can occur between cells.

There are various practical and economic concerns in locating and building each cell site. Various geographic features and the availability of real estate result in an irregular spacing of cell sites. In addition, the density of subscriber traffic (i.e., number of simultaneous users) in some regions requires cell sites to be packed at a higher density than in areas with a lower subscriber traffic volume. A higher cell site density results in an increase in the overlapping areas as well.

The actual coverage pattern for the antenna of any particular cell site is typically not the same in all directions because at any particular distance, various structures or geographic features may produce shadowing, for example. Moreover, a particular antenna pattern may be deliberately manipulated to provide some directionality using specialized antenna design and placement in order to compensate for the irregular spacing of cell sites.

In using a cellular telephone within the wireless network, performance issues such as dropped calls, blocked calls, or noisy calls inevitably occur. Cellular carriers typically provide customer service representatives for handling service inquiries and complaints from customers experiencing these problems. When a customer has experienced a performance problem in connection with a particular wireless telephone call, the customer doesn't know the identity of the cell site that handled the problem call. At best, the customer may provide an address or general description of the place where the problem occurred. Consequently, it has been difficult to relate service problems experienced by one customer with those of other customers. Furthermore, a customer service representative has not been able to determine for themselves or to inform the customer whether a particular performance issue is due to inadequate coverage of a particular location (i.e., the problem in that area is likely to persist), whether additional cell sites are planned in order to correct for a coverage hole, or whether a performance issue is due to a temporary network issue (i.e., the performance for that area is likely to improve at a later time). In addition, it has been difficult for the customer service representative to direct any corrective maintenance actions to appropriate technical personnel for handling in an efficient manner since there is insufficient information available to determine an identification of the cell site involved, whether the subscriber was in a coverage hole (i.e., whether service is even available at the location), or the current performance status of potential cell sites that may have handled the call.

SUMMARY OF THE INVENTION

The present invention provides the advantages of identifying the closest cell sites and whether the customer was within a known coverage hole based on a customer's description of a location. Utilizing a complaint log based on geographic location where the problem was experienced rather than on the identity of particular cell sites facilitates handling of inquiries and allows a more comprehensive analysis of network coverage issues and potential corrective actions.

In one aspect of the invention, a customer service system is provided for a wireless cellular network having a plurality of current cell sites. A current cell site database includes geocoded site location data for each respective current cell site and statistical performance data for each respective current cell site. A complaint database stores user entered complaint records, each of the records including respective geocoded problem location data and a respective complaint note. A monitoring engine is coupled to the current cell sites and to the current cell site database for collecting the statistical performance data and transferring it to the current cell site database. A web server provides a user interface for accessing the current cell site database and the complaint database in order to respond to a service inquiry of a customer based on customer location data.

In another aspect of the invention, a method is provided for assisting a user to respond to a service inquiry of a customer of a wireless cellular network. A location description is entered into a web server for a customer service system. Customer location data is generated according to a coordinate location format in response to the location description. Any existing complaint records in a complaint database are identified having geocoded trouble location data within a predetermined area around the customer location data. The identified complaint records are displayed to the user. Cell sites in a current cell site database are identified having geocoded site location data proximate to the customer location data and an identification of the cell sites are displayed to the user. The web server accepts a complaint note from the user describing a customer problem. A new complaint record is created for storing the complaint note and providing geocoded trouble location data corresponding to the customer location data.

BRIEF DESCRIPTION OF THE DRAWINGS

FIG. 3 is a screen shot showing a portion of a retrieval web page based on the customer location data.

DETAILED DESCRIPTION OF PREFERRED EMBODIMENTS

Figure 1:
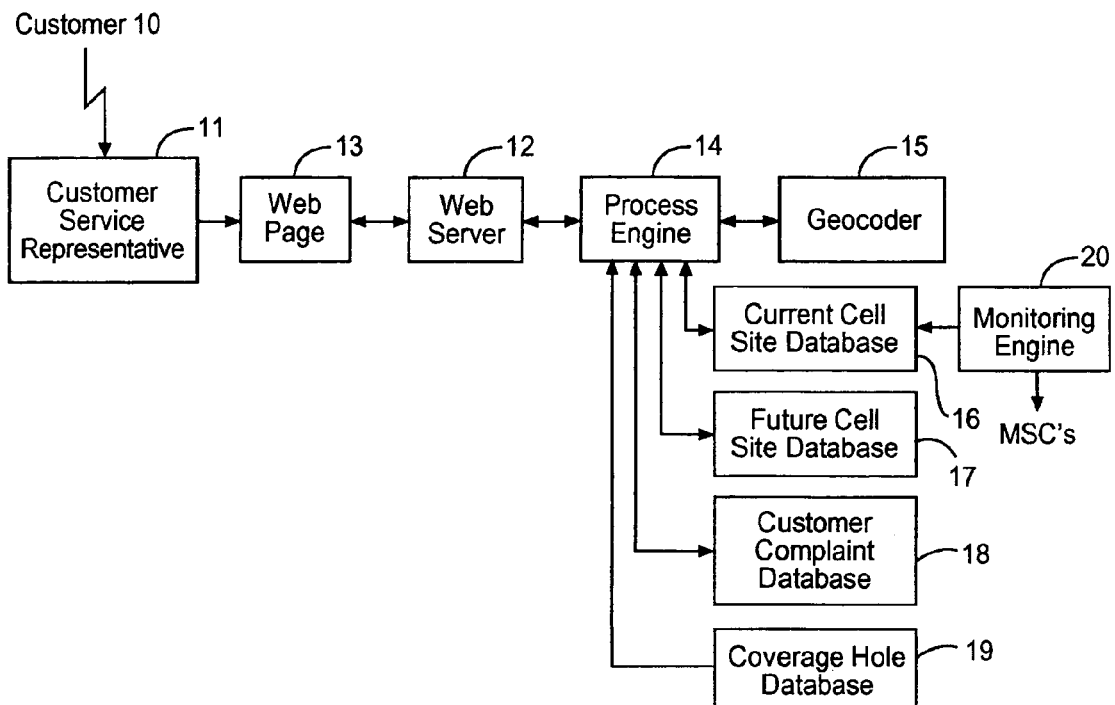
FIG. 1 is a block diagram of a customer service system according to one embodiment of the present invention.

Referring to FIG. 1, a customer 10 desiring to make an inquiry or complaint concerning performance of the cellular network contacts a customer service representative 11, typically via a telephone call either within the cellular network or otherwise. Using the customer support tool of the present invention, the customer service representative 11 interacts with a web server 12 via web page 13. Web server 12 preferably includes a process engine 14 which is programmed to perform various processing tasks as described below.

Process engine 14 is connected to a geocoder 15, a current cell site database 16, a future cell site database 17, a customer complaint database 18, and a coverage hole database 19. A monitoring engine 20 is connected to current cell site database 16 and to mobile switching centers (MSC's) which are in turn connected to the cell sites. In a preferred embodiment, process engine 14 resides on web server 12 along with geocoder 15 and databases 16–19. When the user (i.e., customer service representative 11) enters a location description provided by customer 10 into web page 13, process engine 14 is invoked for generating customer location data in a coordinate location format utilized by databases 16–19. Preferably, databases 16–19 utilize geocoded location data in the format of a latitude and a longitude. In addition to latitude and longitude information, the cell site databases include other manually and automatically configured information such as statistical performance data, map image data, associated mobile switch data, and estimated dates of service for future sites.

Figure 2:
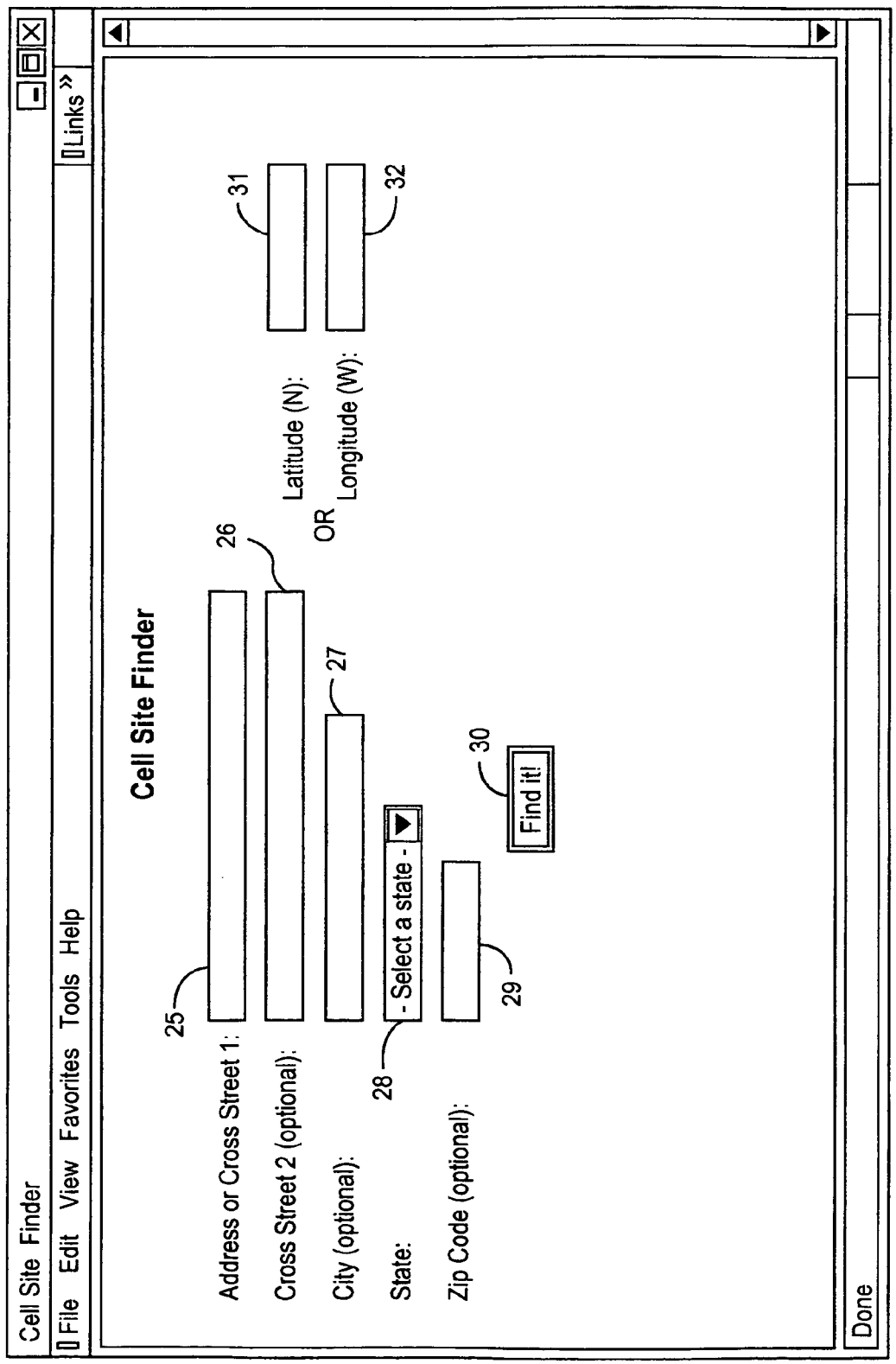
FIG. 2 is a screen shot of a web page for entering a customer's description of a location.

FIG. 2 shows a web page for inputting a location description from a customer to initiate the operation of the customer service system tool. For example, the user may input a street address in a box 25, a city name in box 27, a state name in box 28, and a zip code in box 29. Alternatively, the user may input street names in boxes 25 and 26 thereby utilizing an intersection as the location description. The user then clicks a "find it" button 30 to invoke the geocoder and return customer location data in the desired format (e.g., latitude and longitude). Many geocoders are commercially available and are well known to those skilled in the art.

If a calling customer already knows a latitude and longitude where the complained of telephone service occurred, then these values may be entered into boxes 31 and 32 for identifying the customer location instead of street identifiers. Use of the geocoder may sometimes still be necessary in order to format the latitude and longitude information in the same way as is used by the databases.

Figure 4:
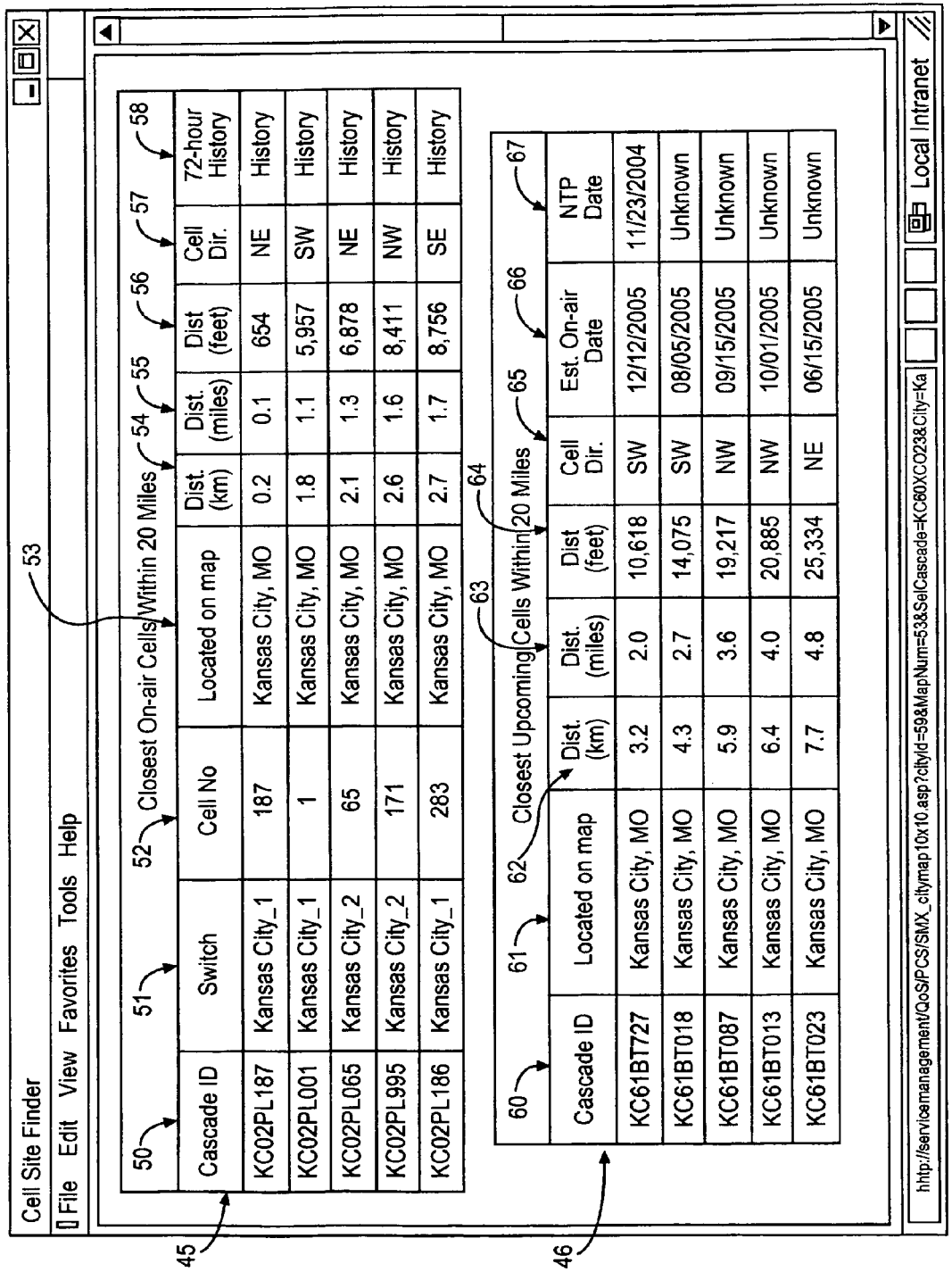
FIG. 4 is a screen shot showing another portion of the retrieval web page based on the customer location data.

After the geocoder generates customer location data in the desired format, a results web page is generated by the process engine and displayed to the user via a web page as shown in FIGS. 3 and 4. As shown in FIG. 3, a street identifier has been selected and the resulting geocoded latitude and longitude from the geocoder are shown in boxes 31 and 32. A confirmation message 35 informs the user of the basis of the successful retrieval of geocode location data. A complaint table 36 is headed by a result message 37 identifying the number of times that the same geocoded location has been marked with a customer complaint within a predetermined period of time. Since complaints are not indexed by cell site, the complaints corresponding to locations within a predetermined distance of the customer location data are retrieved for table 36. Table 36 includes a latitude column 38 and longitude column 39, a time column 40, and a note column 41. Each row in table 36 represents a respective complaint record wherein columns 38–40 are automatically generated by the process engine and wherein the contents of note column 41 were manually entered by a previous customer service representative. Information such as the type of complaint, date and time of the complaint, and customer identification information may be entered for each note.

The web page in FIG. 3 further shows a text box 42 for entry by the customer service representative of a note corresponding to the current complaint. Once a note is completed, the customer service representative clicks on a "mark this location" button 43 to initiate storage of a new complaint record in the customer complaint database. The web page also includes a coverage hole message 44 for indicating the results of a check of the current customer location data against the coverage hole database. Based on the coverage hole information, the customer service representative can advise the customer whether the complaint of performance arises from a coverage hole.

FIG. 4 shows a further portion of the web page automatically created in response to entry of the customer location (e.g., revealed by scrolling down from the view shown in FIG. 3). A current cell site table 45 displays cell sites having geocoded site location data which are proximate to the customer location data. Likewise, a table 46 displays future cell sites having geocoded site location data proximate to the customer location data. For each table, the process engine may preferably identify those cell sites within a predetermined distance of the customer location coordinates. Alternatively, a fixed predetermined number of sites which are the closest to the customer location coordinates may be displayed. In yet another alternative, a predetermined number of the closest cells may be displayed that are within a predetermined distance (e.g., up to a maximum number of cell sites may be displayed provided there are that many cell sites within the predetermined distance).

Table 45 includes a column 50 for providing a cascade identifier (i.e., a network address for the cell site), a column 51 for providing an identification of the mobile switch to which each cell site is coupled, a column 52 for identifying a cell number assigned within the wireless cellular system, a column 53 for indicating a map within the map image database containing the cell site, a column 54 for providing the distance in kilometers between the customer location and the cell site, a column 55 for providing the distance in miles between the customer location and the cell site, a column 56 for providing the distance in feet between the customer location and the cell site, a column 57 for indicating the direction of the cell site from the customer location, and a column 58 for providing a link to a web page containing a 72-hour history of the statistical performance data for each cell site. The identifiers in column 50 are configured as links to a web page containing a map with the cell site located thereon to be presented along with current statistical performance data as described below.

Table 46 presents data concerning future, upcoming cell sites so that the customer service representative can inform a customer in the event that coverage in the identified location is scheduled to improve. Table 46 includes a cascade ID provided in a column 60, a map identification in column 61, a distance measurement in kilometers in column 62, a distance measurement in miles in column 63, a distance measurement in feet in column 64, a direction from the customer location to the future cell site in column 65, an estimated on-air date for each future cell site in column 66, and a date of issuance of a notice to proceed with construction in column 67. Cascade IDs for future cell sites in column 60 are configured as links which generate a web page including the map containing each future cell site.

Figure 5:
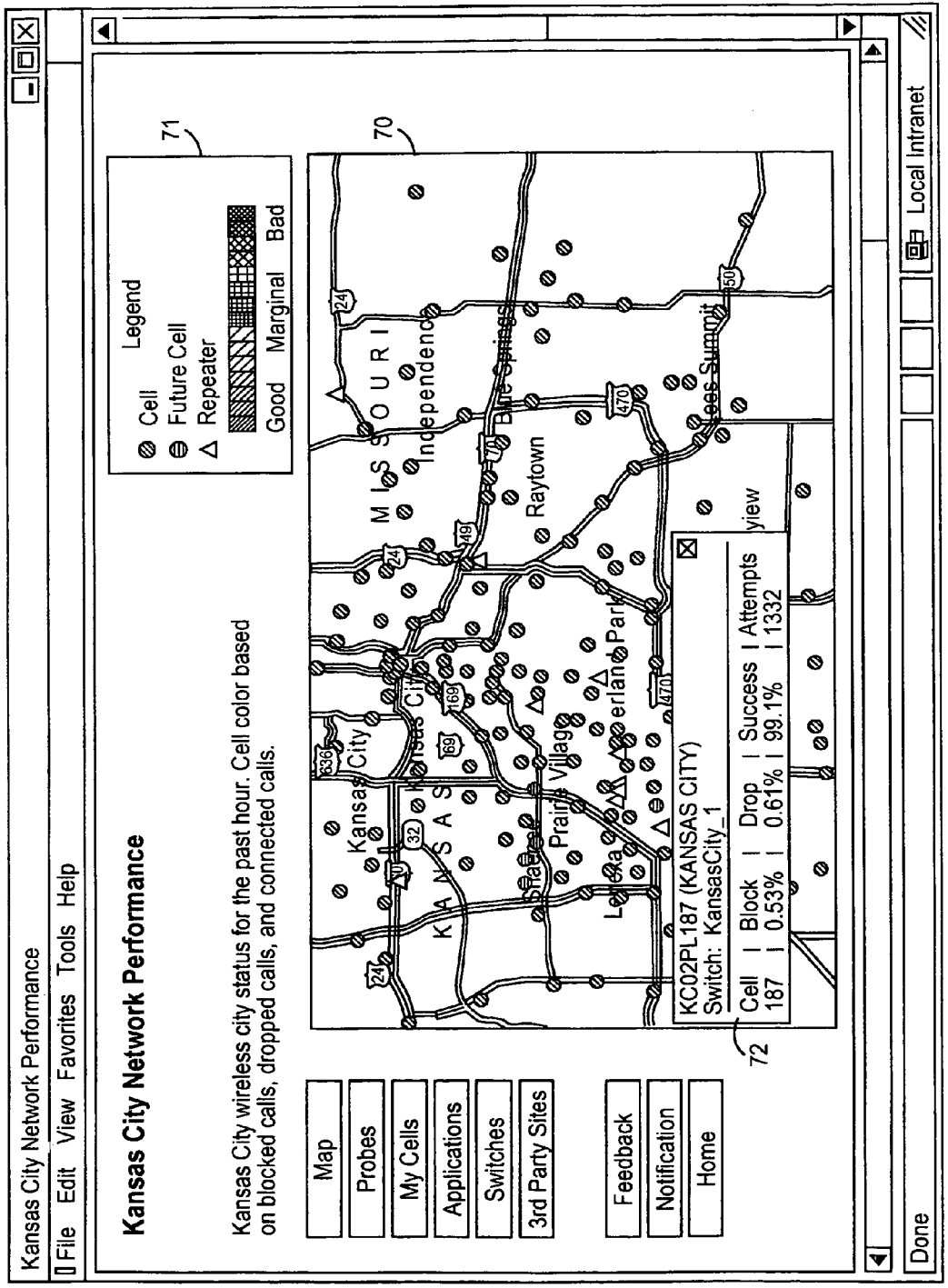
FIG. 5 is a screen shot showing cell site locations proximate to a selected cell site along with statistical performance data on the selected cell site.
Figure 6:
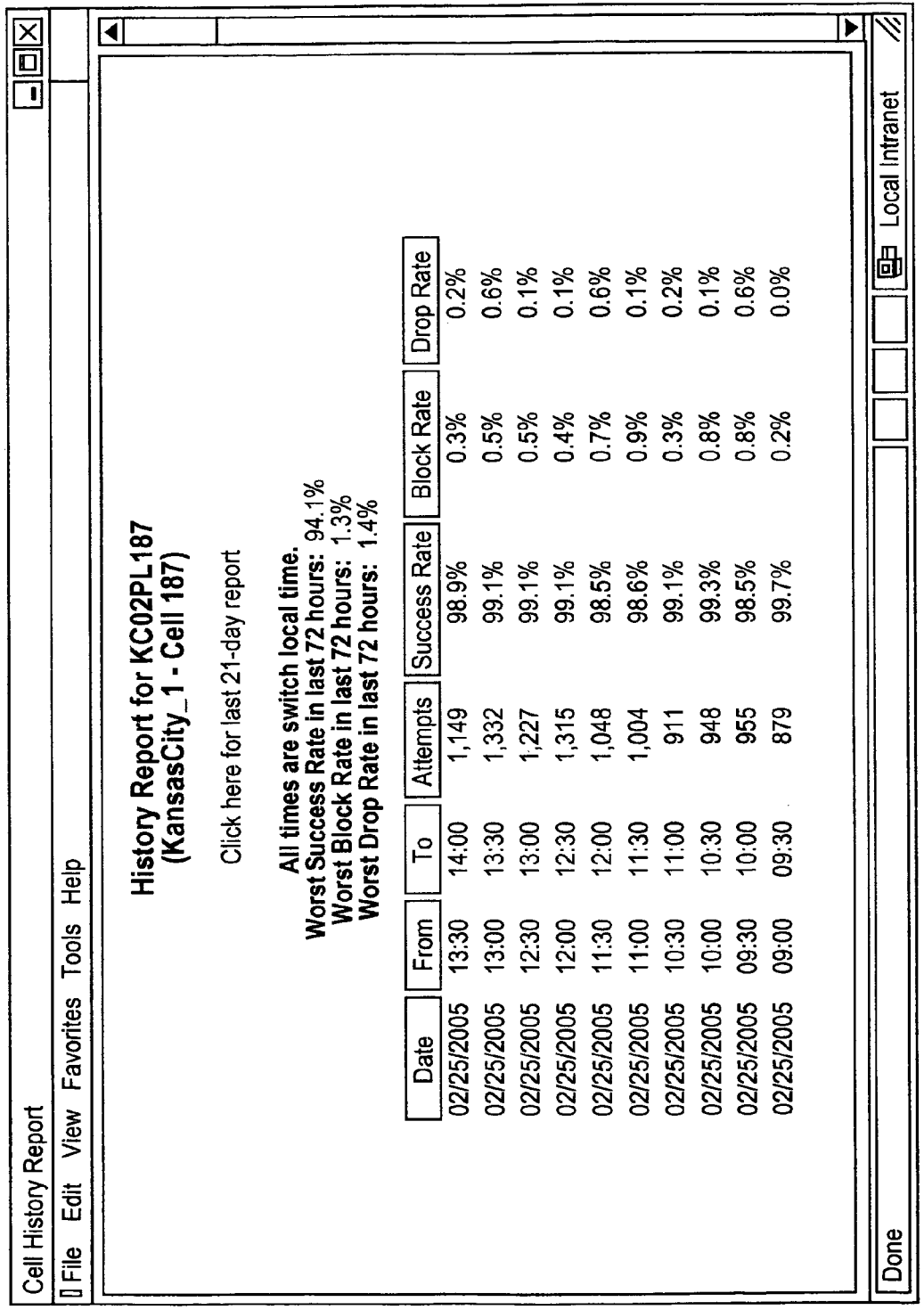
FIG. 6 is a screen shot showing a report of historical performance data for the selected cell site.

FIG. 5 shows a web page reached by clicking a cascade ID of a cell site. A preexisting map image is presented that includes the selected cell site. A map 70 presents a color representation of the plotted location of each respective current and future cell site wherein future cell sites are indicated by a particular color as shown in a legend 71. Current cell sites are shown in a different color as shown by legend 71. The cell site of interest (i.e., the cell site having the cascade ID which was selected by the user) is shown according to a spectrum of colors representing the overall performance status of the cell site with the color indicating whether good, marginal, or poor performance is currently manifest. In addition, a summary box 72 is superimposed over a portion of the map adjacent to the current cell site of interest (i.e., the one selected by the user) to provide a summary of statistical performance data at the current time including a call block rate, a call drop rate, a call success rate, and the number of call attempts. Data are provided for a predetermined period of time, such as the previous one hour. FIG. 6 shows a web page generated in response to selection of the link for a 72-hour history corresponding to a cell site of interest. As shown in FIG. 6, other information presented may include worst case conditions extracted from the table as well as a link to other reports for longer time periods.

Figure 7:
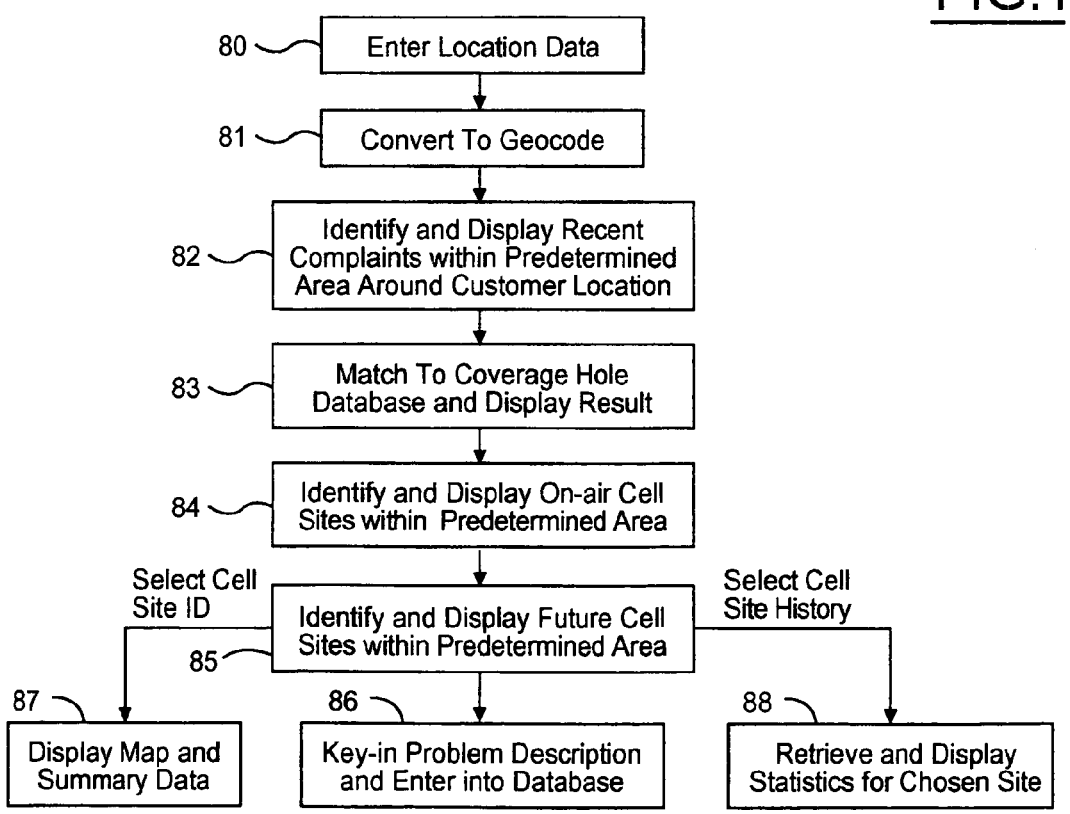
FIG. 7 is a flowchart showing a preferred embodiment of the present invention.

Turning now to FIG. 7, a preferred method is shown wherein the user enters location data received from a calling customer in step 80. The location data from the customer such as cross streets or address are converted to a geocode representation in step 81. Using the geocode representation, the present invention identifies and displays recent complaints within a predetermined area around the customer location in step 82. In step 83, a check is made to determine if there is a match to a coverage hole database for the current location and the result of the comparison is displayed on the web page.

In step 84, the current cell site database is consulted to identify cell sites within a predetermined area or distance from the customer location and the current, on-air cell sites are displayed. Likewise, in step 85 the future cell site database is consulted to identify future cell sites within the predetermined area and they are displayed. From an initial web page, the user then has several options as shown. In step 86, the user keys-in a problem description and enters it into the complaint database. In step 87, the user selects a cell site ID in order to display a map showing current and future cell sites in the area as well as presenting summary data if a current cell site is selected. In step 88, the user selects a cell site history link and thereby retrieves and displays statistics for a chosen site.

What is claimed is:

1. A customer service system for a wireless cellular network having a plurality of current cell sites, comprising:
   a current cell site database including geocoded site location data for each respective current cell site and statistical performance data for each respective current cell site;
   a complaint database storing user entered complaint records, each of said records including respective geocoded problem location data and a respective complaint note;
   a monitoring engine coupled to said current cell sites and to said current cell site database, said monitoring engine collecting said statistical performance data and transferring it to said current cell site database; and
   a web server providing a user interface for accessing said current cell site database and said complaint database in order to respond to a service inquiry of a customer based on customer location data, wherein said user interface displays 1) current cell sites according to proximity to said customer location data, and 2) existing complaint records according to proximity of geocoded problem location data to said customer location data.

2. The customer service system of claim 1 further comprising:
   a future cell site database including geocoded site location data for a plurality of respective future cell sites to be operational in said wireless cellular network at a respective future;
   wherein said web server user interface further accesses said future cell site database to response to said service inquiry of said customer based on said customer location data.

3. The customer service system of claim 1 further comprising:
   a coverage hole database including geocoded hole location data for places known to correspond to lack of coverage by said wireless cellular network;
   wherein said web server displays a result of matching said customer location data with said geocoded hole location data.

4. The customer service system of claim 1 further comprising:
   a geocoder for generating said customer location data according to a coordinate location format utilized for said geocoded site location data in response to location description provided by said customer.

5. The customer service system of claim 1 wherein said current cell sites displayed by said user interface are comprised of current cell sites having geocoded site location data within a predetermined distance of said customer location data.

6. The customer service system of claim 1 wherein said current cell sites displayed by said user interface are comprised of a predetermined number of closest cell sites.

7. The customer service system of claim 1 wherein said existing complaint records displayed by said user interface are comprised of said records having geocoded problem location data within a predetermined distance of said customer location data.

8. The customer service system of claim 1 wherein said user interface provides information to said complaint database to create a complaint record having geocoded trouble location data corresponding to said customer location data and having a complaint note entered by said user to characterize said service inquiry.

9. The customer service system of claim 1 wherein said statistical performance data is comprised of call attempts, call success rate, call dropped rate, and call blocked rate.

10. A method assisting a user to respond to a service inquiry of a customer of a wireless cellular network, said method comprising the steps of:
    entering a location description to a web server for a customer service system;
    generating customer location data according to a coordinate location format in response to said location description;

identifying in a complaint database any complaint records having geocoded trouble location data within a predetermined area around said customer location data;
displaying said identified complaint records to said user;
identifying in a current cell site database cell sites having geocoded site location data proximate to said customer location data;
displaying an identification of said cell sites to said user;
accepting from said user a complaint note describing a customer problem; and
creating a new complaint record storing said complaint note and providing geocoded trouble location data corresponding to said customer location data.

11. The method of claim 10 wherein said location description is comprised of a street identifier given to said user by said customer, and wherein said coordinate location format is comprised of a latitude and a longitude.

12. The method of claim 10 wherein said identified current cell sites are comprised of cell sites within a predetermined distance of said customer location data.

13. The method of claim 10 further comprising the steps of:
identifying in a future cell site database future cell sites having geocoded site location data proximate to said customer location data;
displaying an identification of said future cell sites to said user.

14. The method of claim 10 further comprising the steps of:
comparing said customer location data with areas stored in a coverage hole database to determine whether said customer location data corresponds to a known coverage hole of said wireless cellular network; and
displaying a result of said comparison to said user.

15. The method of claim 10 further comprising the steps of:
said user selecting a displayed cell site;
displaying a street map of an area surrounding said selected cell site;
preparing current statistical performance data for said selected cell site; and
displaying said current statistical performance data to said user in conjunction with said street map.

16. The method of claim 10 further comprising the steps of:
displaying a link for a statistical performance data history for each respective displayed cell site;
said user selecting one of said links for a selected cell site;
preparing statistical performance data for said selected cell site according to a plurality of respective time periods; and
displaying said statistical performance data to said user in a table according to said respective time periods.

17. A customer service system for a wireless cellular network having a plurality of current cell sites, comprising:
a current cell site database including geocoded site location data for each respective current cell site and statistical performance data for each respective current cell site;
a complaint database storing user entered complaint records, each of said records including respective geocoded problem location data and a respective complaint note;
a monitoring engine coupled to said current cell sites and to said current cell site database, said monitoring engine collecting said statistical performance data and transferring it to said current cell site database;
a web server providing a user interface for accessing said current cell site database and said complaint database in order to respond to a service inquiry of a customer based on customer location data; and
a future cell site database including geocoded site location data for a plurality of respective future cell sites to be operational in said wireless cellular network at a respective future;
wherein said web server user interface further accesses said future cell site database to response to said service inquiry of said customer based on said customer location data.

18. A customer service system for a wireless cellular network having a plurality of current cell sites, comprising:
a current cell site database including geocoded site location data for each respective current cell site and statistical performance data for each respective current cell site;
a complaint database storing user entered complaint records, each of said records including respective geocoded problem location data and a respective complaint note;
a monitoring engine coupled to said current cell sites and to said current cell site database, said monitoring engine collecting said statistical performance data and transferring it to said current cell site database;
a web server providing a user interface for accessing said current cell site database and said complaint database in order to respond to a service inquiry of a customer based on customer location data; and
a coverage hole database including geocoded hole location data for places known to correspond to lack of coverage by said wireless cellular network;
wherein said web server displays a result of matching said customer location data with said geocoded hole location data.

* * * * *